United States Patent
Abhijeet et al.

(10) Patent No.: US 10,176,191 B2
(45) Date of Patent: *Jan. 8, 2019

(54) RECOVERING FROM CONFLICTS THAT EMERGE FROM EVENTUALLY CONSISTENT OPERATIONS

(71) Applicant: International Business Machines Corporation, Armonk, NY (US)

(72) Inventors: Kumar Abhijeet, Chicago, IL (US); Andrew D. Baptist, Mt. Pleasant, WI (US); Wesley B. Leggette, Chicago, IL (US); Greg R. Dhuse, Chicago, IL (US); Jason K. Resch, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/837,979

(22) Filed: Dec. 11, 2017

(65) Prior Publication Data

US 2018/0137140 A1  May 17, 2018

Related U.S. Application Data

(63) Continuation of application No. 14/794,723, filed on Jul. 8, 2015, now Pat. No. 10,049,120.

(Continued)

(51) Int. Cl.
*G06F 12/00* (2006.01)
*G06F 17/30* (2006.01)
*H04L 29/08* (2006.01)

(52) U.S. Cl.
CPC .. *G06F 17/30194* (2013.01); *G06F 17/30371* (2013.01); *G06F 17/30557* (2013.01); *H04L 67/1097* (2013.01)

(58) Field of Classification Search
None
See application file for complete search history.

(56) References Cited

U.S. PATENT DOCUMENTS 4,092,732 A  5/1978  Ouchi
5,454,101 A  9/1995  Mackay et al.
(Continued)

OTHER PUBLICATIONS

Chung; An Automatic Data Segmentation Method for 3D Measured Data Points; National Taiwan University; pp. 1-8; 1998.
(Continued)

*Primary Examiner* — Tuan A Pham
(74) *Attorney, Agent, or Firm* — Garlick & Markison; Timothy W. Markison; Bruce E. Stuckman (57) ABSTRACT

A method begins by detecting an inconsistency between a first version of an object at a first storage target within the DSN and a second version of the object at second storage target of the DSN. The method continues by accessing an operation log of the DSN to identify relevant entries regarding the object. The method continues by selecting an inconsistency resolution approach from a list of inconsistency resolution approaches based on a type of inconsistency between the first and second versions of the object and based on the relevant entries. When the selected inconsistency resolution approach is a multiple version storage option, the method continues by sending a first storage request to the first storage target to store the first version of the object and a second storage request to the second storage target to store the second version of the object.

10 Claims, 9 Drawing Sheets

Related U.S. Application Data (60) Provisional application No. 62/046,444, filed on Sep. 5, 2014.

(56) References Cited

U.S. PATENT DOCUMENTS

| | | | |
|---|---|---|---|
| 5,485,474 | A | 1/1996 | Rabin |
| 5,774,643 | A | 6/1998 | Lubbers et al. |
| 5,802,364 | A | 9/1998 | Senator et al. |
| 5,809,285 | A | 9/1998 | Hilland |
| 5,890,156 | A | 3/1999 | Rekieta et al. |
| 5,987,622 | A | 11/1999 | Lo Verso et al. |
| 5,991,414 | A | 11/1999 | Garay et al. |
| 6,012,159 | A | 1/2000 | Fischer et al. |
| 6,058,454 | A | 5/2000 | Gerlach et al. |
| 6,128,277 | A | 10/2000 | Bruck et al. |
| 6,175,571 | B1 | 1/2001 | Haddock et al. |
| 6,192,472 | B1 | 2/2001 | Garay et al. |
| 6,256,688 | B1 | 7/2001 | Suetaka et al. |
| 6,272,658 | B1 | 8/2001 | Steele et al. |
| 6,301,604 | B1 | 10/2001 | Nojima |
| 6,356,949 | B1 | 3/2002 | Katsandres et al. |
| 6,366,995 | B1 | 4/2002 | Vilkov et al. |
| 6,374,336 | B1 | 4/2002 | Peters et al. |
| 6,415,373 | B1 | 7/2002 | Peters et al. |
| 6,418,539 | B1 | 7/2002 | Walker |
| 6,449,688 | B1 | 9/2002 | Peters et al. |
| 6,567,948 | B2 | 5/2003 | Steele et al. |
| 6,571,282 | B1 | 5/2003 | Bowman-Amuah |
| 6,609,223 | B1 | 8/2003 | Wolfgang |
| 6,718,361 | B1 | 4/2004 | Basani et al. |
| 6,760,808 | B2 | 7/2004 | Peters et al. |
| 6,785,768 | B2 | 8/2004 | Peters et al. |
| 6,785,783 | B2 | 8/2004 | Buckland |
| 6,826,711 | B2 | 11/2004 | Moulton et al. |
| 6,879,596 | B1 | 4/2005 | Dooply |
| 7,003,688 | B1 | 2/2006 | Pittelkow et al. |
| 7,024,451 | B2 | 4/2006 | Jorgenson |
| 7,024,609 | B2 | 4/2006 | Wolfgang et al. |
| 7,080,101 | B1 | 7/2006 | Watson et al. |
| 7,103,824 | B2 | 9/2006 | Halford |
| 7,103,915 | B2 | 9/2006 | Redlich et al. |
| 7,111,115 | B2 | 9/2006 | Peters et al. |
| 7,140,044 | B2 | 11/2006 | Redlich et al. |
| 7,146,644 | B2 | 12/2006 | Redlich et al. |
| 7,171,493 | B2 | 1/2007 | Shu et al. |
| 7,222,133 | B1 | 5/2007 | Raipurkar et al. |
| 7,240,236 | B2 | 7/2007 | Cutts et al. |
| 7,272,613 | B2 | 9/2007 | Sim et al. |
| 7,636,724 | B2 | 12/2009 | de la Torre et al. |
| 2002/0062422 | A1 | 5/2002 | Butterworth et al. |
| 2002/0166079 | A1 | 11/2002 | Ulrich et al. |
| 2003/0018927 | A1 | 1/2003 | Gadir et al. |
| 2003/0037261 | A1 | 2/2003 | Meffert et al. |
| 2003/0065617 | A1 | 4/2003 | Watkins et al. |
| 2003/0084020 | A1 | 5/2003 | Shu |
| 2004/0024963 | A1 | 2/2004 | Talagala et al. |
| 2004/0122917 | A1 | 6/2004 | Menon et al. |
| 2004/0215998 | A1 | 10/2004 | Buxton et al. |
| 2004/0228493 | A1 | 11/2004 | Ma |
| 2005/0100022 | A1 | 5/2005 | Ramprashad |
| 2005/0114594 | A1 | 5/2005 | Corbett et al. |
| 2005/0125593 | A1 | 6/2005 | Karpoff et al. |
| 2005/0131993 | A1 | 6/2005 | Fatula |
| 2005/0132070 | A1 | 6/2005 | Redlich et al. |
| 2005/0144382 | A1 | 6/2005 | Schmisseur |
| 2005/0229069 | A1 | 10/2005 | Hassner et al. |
| 2006/0047907 | A1 | 3/2006 | Shiga et al. |
| 2006/0136448 | A1 | 6/2006 | Cialini et al. |
| 2006/0156059 | A1 | 7/2006 | Kitamura |
| 2006/0224603 | A1 | 10/2006 | Correll |
| 2007/0079081 | A1 | 4/2007 | Gladwin et al. |
| 2007/0079082 | A1* | 4/2007 | Gladwin ............ G06F 11/1076 711/154 |
| 2007/0079083 | A1* | 4/2007 | Gladwin ............ G06F 21/6227 711/154 |
| 2007/0088970 | A1 | 4/2007 | Buxton et al. |
| 2007/0174192 | A1 | 7/2007 | Gladwin et al. |
| 2007/0214285 | A1 | 9/2007 | Au et al. |
| 2007/0234110 | A1 | 10/2007 | Soran et al. |
| 2007/0283167 | A1 | 12/2007 | Venters et al. |
| 2009/0094251 | A1 | 4/2009 | Gladwin et al. |
| 2009/0094318 | A1 | 4/2009 | Gladwin et al. |
| 2010/0023524 | A1 | 1/2010 | Gladwin et al. |
| 2011/0055170 | A1* | 3/2011 | Mark ............... G06F 17/30067 707/691 |
| 2011/0289283 | A1* | 11/2011 | Baptist ............... H04L 9/085 711/154 |
| 2012/0226933 | A1* | 9/2012 | Baptist ............... G06F 11/0727 714/6.2 |
| 2012/0254692 | A1* | 10/2012 | Resch ............... G06F 11/1044 714/763 |

OTHER PUBLICATIONS

Harrison; Lightweight Directory Access Protocol (LDAP): Authentication Methods and Security Mechanisms; IETF Network Working Group; RFC 4513; Jun. 2006; pp. 1-32.

Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

Legg; Lightweight Directory Access Protocol (LDAP): Syntaxes and Matching Rules; IETF Network Working Group; RFC 4517; Jun. 2006; pp. 1-50.

Plank, T1: Erasure Codes for Storage Applications; FAST2005, 4th Usenix Conference on File Storage Technologies; Dec. 13-16, 2005; pp. 1-74.

Rabin; Efficient Dispersal of Information for Security, Load Balancing, and Fault Tolerance; Journal of the Association for Computer Machinery; vol. 36, No. 2; Apr. 1989; pp. 335-348.

Satran, et al.; Internet Small Computer Systems Interface (iSCSI); IETF Network Working Group; RFC 3720; Apr. 2004; pp. 1-257.

Sciberras; Lightweight Directory Access Protocol (LDAP): Schema for User Applications; IETF Network Working Group; RFC 4519; Jun. 2006; pp. 1-33.

Sermersheim; Lightweight Directory Access Protocol (LDAP): The Protocol; IETF Network Working Group; RFC 4511; Jun. 2006; pp. 1-68.

Shamir; How to Share a Secret; Communications of the ACM; vol. 22, No. 11; Nov. 1979; pp. 612-613.

Smith; Lightweight Directory Access Protocol (LDAP): Uniform Resource Locator; IETF Network Working Group; RFC 4516; Jun. 2006; pp. 1-15.

Smith; Lightweight Directory Access Protocol (LDAP): String Representation of Search Filters; IETF Network Working Group; RFC 4515; Jun. 2006; pp. 1-12.

Wildi; Java iSCSi Initiator; Master Thesis; Department of Computer and Information Science, University of Konstanz; Feb. 2007; 60 pgs.

Xin, et al.; Evaluation of Distributed Recovery in Large-Scale Storage Systems; 13th IEEE International Symposium on High Performance Distributed Computing; Jun. 2004; pp. 172-181.

Zeilenga; Lightweight Directory Access Protocol (LDAP): String Representation of Distinguished Names; IETF Network Working Group; RFC 4514; Jun. 2006; pp. 1-15.

Zeilenga; Lightweight Directory Access Protocol (LDAP): Technical Specification Road Map; IETF Network Working Group; RFC 4510; Jun. 2006; pp. 1-8.

Zeilenga; Lightweight Directory Access Protocol (LDAP): Directory Information Models; IETF Network Working Group; RFC 4512; Jun. 2006; pp. 1-49.

Zeilenga; Lightweight Directory Access Protocol (LDAP): Internationalized String Preparation; IETF Network Norking Group; RFC 4518; Jun. 2006; pp. 1-14.

* cited by examiner

RECOVERING FROM CONFLICTS THAT EMERGE FROM EVENTUALLY CONSISTENT OPERATIONS

CROSS-REFERENCE TO RELATED APPLICATIONS

The present U.S. Utility patent application claims priority pursuant to 35 U.S.C. § 120 as a continuation-in-part of U.S. Utility application Ser. No. 14/794,723, entitled "CONSISTENCY BASED ACCESS OF DATA IN A DISPERSED STORAGE NETWORK", filed Jul. 8, 2015, which claims priority pursuant to 35 U.S.C. § 119(e) to U.S. Provisional Application No. 62/046,444, entitled "FACILITATING DATA CONSISTENCY IN A DISPERSED STORAGE NETWORK," filed Sep. 5, 2014, both of which are hereby incorporated herein by reference in their entirety and made part of the present U.S. Utility patent application for all purposes.

STATEMENT REGARDING FEDERALLY SPONSORED RESEARCH OR DEVELOPMENT

Not applicable.

INCORPORATION-BY-REFERENCE OF MATERIAL SUBMITTED ON A COMPACT DISC

Not applicable.

BACKGROUND OF THE INVENTION

Technical Field of the Invention

This invention relates generally to computer networks and more particularly to dispersing error encoded data.

Description of Related Art

Computing devices are known to communicate data, process data, and/or store data. Such computing devices range from wireless smart phones, laptops, tablets, personal computers (PC), work stations, and video game devices, to data centers that support millions of web searches, stock trades, or on-line purchases every day. In general, a computing device includes a central processing unit (CPU), a memory system, user input/output interfaces, peripheral device interfaces, and an interconnecting bus structure.

As is further known, a computer may effectively extend its CPU by using "cloud computing" to perform one or more computing functions (e.g., a service, an application, an algorithm, an arithmetic logic function, etc.) on behalf of the computer. Further, for large services, applications, and/or functions, cloud computing may be performed by multiple cloud computing resources in a distributed manner to improve the response time for completion of the service, application, and/or function. For example, Hadoop is an open source software framework that supports distributed applications enabling application execution by thousands of computers.

In addition to cloud computing, a computer may use "cloud storage" as part of its memory system. As is known, cloud storage enables a user, via its computer, to store files, applications, etc. on an Internet storage system. The Internet storage system may include a RAID (redundant array of independent disks) system and/or a dispersed storage system that uses an error correction scheme to encode data for storage.

DETAILED DESCRIPTION OF THE INVENTION

Figure 1:
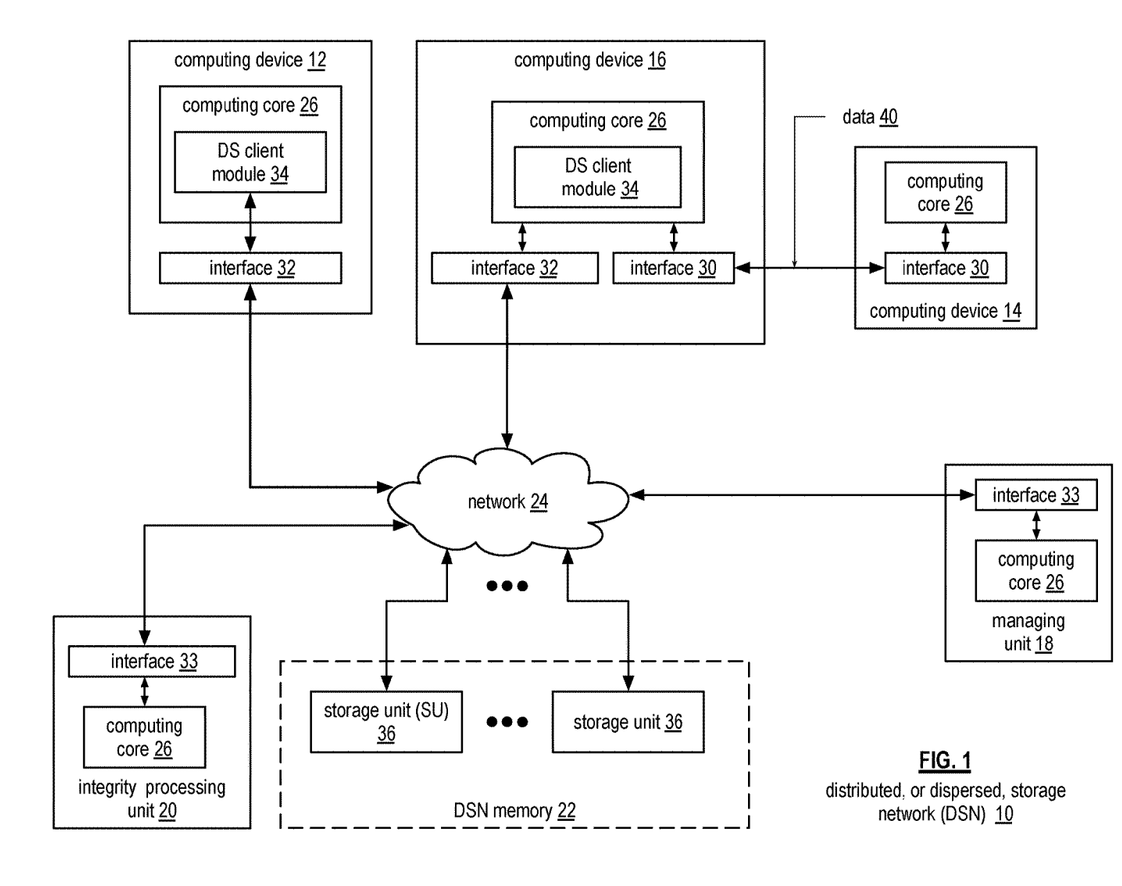
FIG. 1 is a schematic block diagram of an embodiment of a dispersed or distributed storage network (DSN) in accordance with the present invention.

FIG. 1 is a schematic block diagram of an embodiment of a dispersed, or distributed, storage network (DSN) 10 that includes a plurality of computing devices 12-16, a managing unit 18, an integrity processing unit 20, and a DSN memory 22. The components of the DSN 10 are coupled to a network 24, which may include one or more wireless and/or wire lined communication systems; one or more non-public intranet systems and/or public internet systems; and/or one or more local area networks (LAN) and/or wide area networks (WAN).

Figure 2:
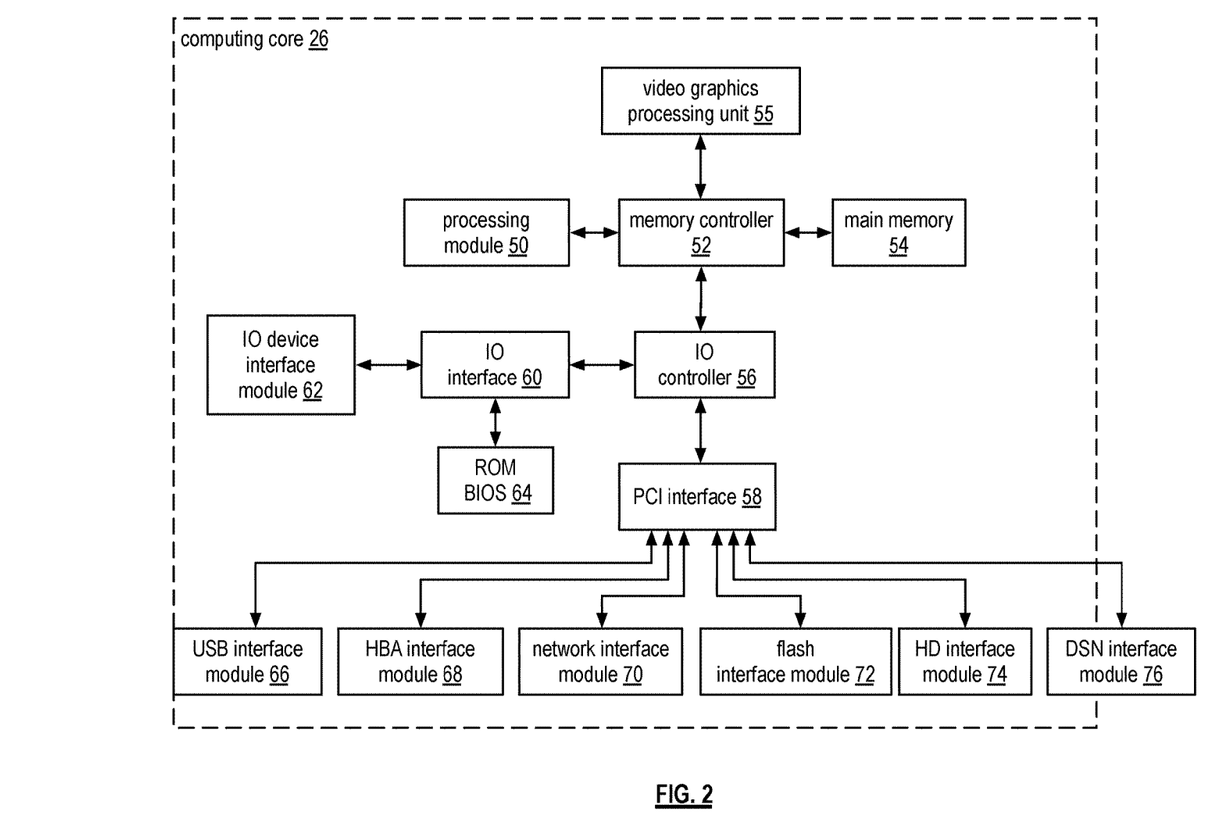
FIG. 2 is a schematic block diagram of an embodiment of a computing core in accordance with the present invention.

The DSN memory 22 includes a plurality of storage units 36 that may be located at geographically different sites (e.g., one in Chicago, one in Milwaukee, etc.), at a common site, or a combination thereof. For example, if the DSN memory 22 includes eight storage units 36, each storage unit is located at a different site. As another example, if the DSN memory 22 includes eight storage units 36, all eight storage units are located at the same site. As yet another example, if the DSN memory 22 includes eight storage units 36, a first pair of storage units are at a first common site, a second pair of storage units are at a second common site, a third pair of storage units are at a third common site, and a fourth pair of storage units are at a fourth common site. Note that a DSN memory 22 may include more or less than eight storage units 36. Further note that each storage unit 36 includes a computing core (as shown in FIG. 2, or components thereof) and a plurality of memory devices for storing dispersed error encoded data.

Each of the computing devices 12-16, the managing unit 18, and the integrity processing unit 20 include a computing core 26, which includes network interfaces 30-33. Computing devices 12-16 may each be a portable computing device and/or a fixed computing device. A portable computing device may be a social networking device, a gaming device, a cell phone, a smart phone, a digital assistant, a digital music player, a digital video player, a laptop computer, a handheld computer, a tablet, a video game controller, and/or any other portable device that includes a computing core. A fixed computing device may be a computer (PC), a computer server, a cable set-top box, a satellite receiver, a television set, a printer, a fax machine, home entertainment equipment, a video game console, and/or any type of home or office computing equipment. Note that each of the managing unit 18 and the integrity processing unit 20 may be separate computing devices, may be a common computing device, and/or may be integrated into one or more of the computing devices 12-16 and/or into one or more of the storage units 36.

Each interface 30, 32, and 33 includes software and hardware to support one or more communication links via the network 24 indirectly and/or directly. For example, interface 30 supports a communication link (e.g., wired, wireless, direct, via a LAN, via the network 24, etc.) between computing devices 14 and 16. As another example, interface 32 supports communication links (e.g., a wired connection, a wireless connection, a LAN connection, and/or any other type of connection to/from the network 24) between computing devices 12 & 16 and the DSN memory 22. As yet another example, interface 33 supports a communication link for each of the managing unit 18 and the integrity processing unit 20 to the network 24.

Computing devices 12 and 16 include a dispersed storage (DS) client module 34, which enables the computing device to dispersed storage error encode and decode data as subsequently described with reference to one or more of FIGS. 3-8. In this example embodiment, computing device 16 functions as a dispersed storage processing agent for computing device 14. In this role, computing device 16 dispersed storage error encodes and decodes data (e.g., data 40) on behalf of computing device 14. With the use of dispersed storage error encoding and decoding, the DSN 10 is tolerant of a significant number of storage unit failures (the number of failures is based on parameters of the dispersed storage error encoding function) without loss of data and without the need for a redundant or backup copies of the data. Further, the DSN 10 stores data for an indefinite period of time without data loss and in a secure manner (e.g., the system is very resistant to unauthorized attempts at accessing the data).

In operation, the managing unit 18 performs DS management services. For example, the managing unit 18 establishes distributed data storage parameters (e.g., vault creation, distributed storage parameters, security parameters, billing information, user profile information, etc.) for computing devices 12-14 individually or as part of a group of user devices. As a specific example, the managing unit 18 coordinates creation of a vault (e.g., a virtual memory block associated with a portion of an overall namespace of the DSN) within the DSN memory 22 for a user device, a group of devices, or for public access and establishes per vault dispersed storage (DS) error encoding parameters for a vault. The managing unit 18 facilitates storage of DS error encoding parameters for each vault by updating registry information of the DSN 10, where the registry information may be stored in the DSN memory 22, a computing device 12-16, the managing unit 18, and/or the integrity processing unit 20.

The DSN managing unit 18 creates and stores user profile information (e.g., an access control list (ACL)) in local memory and/or within memory of the DSN memory 22. The user profile information includes authentication information, permissions, and/or the security parameters. The security parameters may include encryption/decryption scheme, one or more encryption keys, key generation scheme, and/or data encoding/decoding scheme.

The DSN managing unit 18 creates billing information for a particular user, a user group, a vault access, public vault access, etc. For instance, the DSN managing unit 18 tracks the number of times a user accesses a non-public vault and/or public vaults, which can be used to generate a per-access billing information. In another instance, the DSN managing unit 18 tracks the amount of data stored and/or retrieved by a user device and/or a user group, which can be used to generate a per-data-amount billing information.

As another example, the managing unit 18 performs network operations, network administration, and/or network maintenance. Network operations includes authenticating user data allocation requests (e.g., read and/or write requests), managing creation of vaults, establishing authentication credentials for user devices, adding/deleting components (e.g., user devices, storage units, and/or computing devices with a DS client module 34) to/from the DSN 10, and/or establishing authentication credentials for the storage units 36. Network administration includes monitoring devices and/or units for failures, maintaining vault information, determining device and/or unit activation status, determining device and/or unit loading, and/or determining any other system level operation that affects the performance level of the DSN 10. Network maintenance includes facilitating replacing, upgrading, repairing, and/or expanding a device and/or unit of the DSN 10.

The integrity processing unit 20 performs rebuilding of 'bad' or missing encoded data slices. At a high level, the integrity processing unit 20 performs rebuilding by periodically attempting to retrieve/list encoded data slices, and/or slice names of the encoded data slices, from the DSN memory 22. For retrieved encoded slices, they are checked for errors due to data corruption, outdated version, etc. If a slice includes an error, it is flagged as a 'bad' slice. For encoded data slices that were not received and/or not listed, they are flagged as missing slices. Bad and/or missing slices are subsequently rebuilt using other retrieved encoded data slices that are deemed to be good slices to produce rebuilt slices. The rebuilt slices are stored in the DSN memory 22.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface module 60, at least one IO device interface module 62, a read only memory (ROM) basic input output system (BIOS) 64, and one or more memory interface modules. The one or more memory interface module(s) includes one or more of a universal serial bus (USB) interface module 66, a host bus adapter (HBA) interface module 68, a network interface module 70, a flash interface module 72, a hard drive interface module 74, and a DSN interface module 76.

The DSN interface module 76 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). The DSN interface module 76 and/or the network interface module 70 may function as one or more of the interface 30-33 of FIG. 1. Note that the IO device interface module 62 and/or the memory interface modules 66-76 may be collectively or individually referred to as IO ports.

Figures 3, 4:
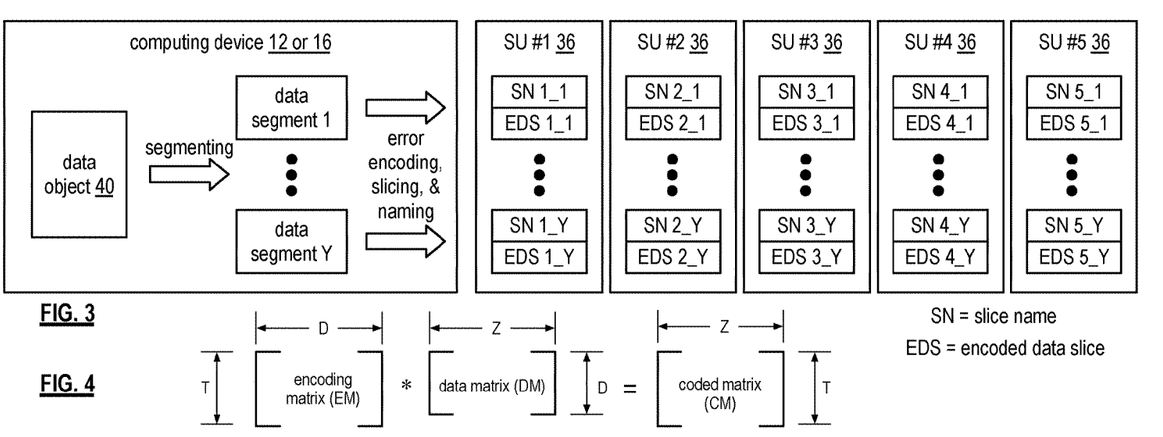
FIG. 3 is a schematic block diagram of an example of dispersed storage error encoding of data in accordance with the present invention.
FIG. 4 is a schematic block diagram of a generic example of an error encoding function in accordance with the present invention.

FIG. 3 is a schematic block diagram of an example of dispersed storage error encoding of data. When a computing device 12 or 16 has data to store it disperse storage error encodes the data in accordance with a dispersed storage error encoding process based on dispersed storage error encoding parameters. The dispersed storage error encoding parameters include an encoding function (e.g., information dispersal algorithm, Reed-Solomon, Cauchy Reed-Solomon, systematic encoding, non-systematic encoding, on-line codes, etc.), a data segmenting protocol (e.g., data segment size, fixed, variable, etc.), and per data segment encoding values. The per data segment encoding values include a total, or pillar width, number (T) of encoded data slices per encoding of a data segment i.e., in a set of encoded data slices); a decode threshold number (D) of encoded data slices of a set of encoded data slices that are needed to recover the data segment; a read threshold number (R) of encoded data slices to indicate a number of encoded data slices per set to be read from storage for decoding of the data segment; and/or a write threshold number (W) to indicate a number of encoded data slices per set that must be accurately stored before the encoded data segment is deemed to have been properly stored. The dispersed storage error encoding parameters may further include slicing information (e.g., the number of encoded data slices that will be created for each data segment) and/or slice security information (e.g., per encoded data slice encryption, compression, integrity checksum, etc.).

Figure 5:
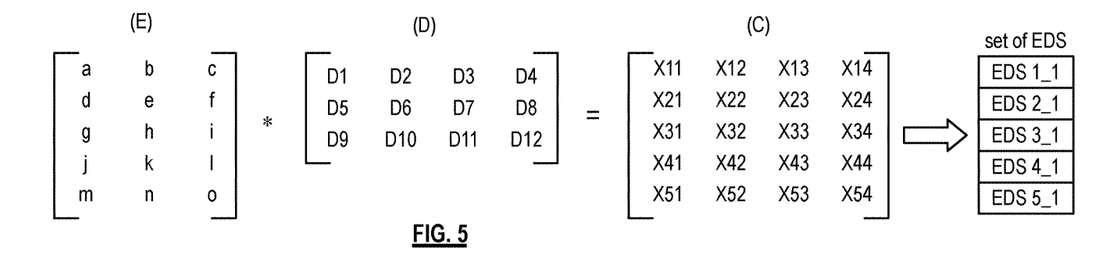
FIG. 5 is a schematic block diagram of a specific example of an error encoding function in accordance with the present invention.

In the present example, Cauchy Reed-Solomon has been selected as the encoding function (a generic example is shown in FIG. 4 and a specific example is shown in FIG. 5); the data segmenting protocol is to divide the data object into fixed sized data segments; and the per data segment encoding values include: a pillar width of 5, a decode threshold of 3, a read threshold of 4, and a write threshold of 4. In accordance with the data segmenting protocol, the computing device 12 or 16 divides the data (e.g., a file (e.g., text, video, audio, etc.), a data object, or other data arrangement) into a plurality of fixed sized data segments (e.g., 1 through Y of a fixed size in range of Kilo-bytes to Tera-bytes or more). The number of data segments created is dependent of the size of the data and the data segmenting protocol.

The computing device 12 or 16 then disperse storage error encodes a data segment using the selected encoding function (e.g., Cauchy Reed-Solomon) to produce a set of encoded data slices. FIG. 4 illustrates a generic Cauchy Reed-Solomon encoding function, which includes an encoding matrix (EM), a data matrix (DM), and a coded matrix (CM). The size of the encoding matrix (EM) is dependent on the pillar width number (T) and the decode threshold number (D) of selected per data segment encoding values. To produce the data matrix (DM), the data segment is divided into a plurality of data blocks and the data blocks are arranged into D number of rows with Z data blocks per row. Note that Z is a function of the number of data blocks created from the data segment and the decode threshold number (D). The coded matrix is produced by matrix multiplying the data matrix by the encoding matrix.

FIG. 5 illustrates a specific example of Cauchy Reed-Solomon encoding with a pillar number (T) of five and decode threshold number of three. In this example, a first data segment is divided into twelve data blocks (D1-D12). The coded matrix includes five rows of coded data blocks, where the first row of X11-X14 corresponds to a first encoded data slice (EDS 1_1), the second row of X21-X24 corresponds to a second encoded data slice (EDS 2_1), the third row of X31-X34 corresponds to a third encoded data slice (EDS 3_1), the fourth row of X41-X44 corresponds to a fourth encoded data slice (EDS 4_1), and the fifth row of X51-X54 corresponds to a fifth encoded data slice (EDS 5_1). Note that the second number of the EDS designation corresponds to the data segment number.

Figure 6:
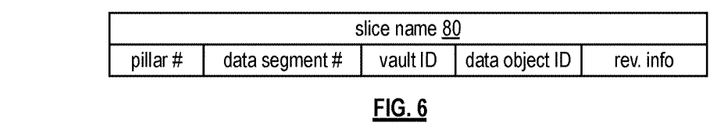
FIG. 6 is a schematic block diagram of an example of a slice name of an encoded data slice (EDS) in accordance with the present invention.

Returning to the discussion of FIG. 3, the computing device also creates a slice name (SN) for each encoded data slice (EDS) in the set of encoded data slices. A typical format for a slice name 80 is shown in FIG. 6. As shown, the slice name (SN) 80 includes a pillar number of the encoded data slice (e.g., one of 1-T), a data segment number (e.g., one of 1-Y), a vault identifier (ID), a data object identifier (ID), and may further include revision level information of the encoded data slices. The slice name functions as, at least part of, a DSN address for the encoded data slice for storage and retrieval from the DSN memory 22.

As a result of encoding, the computing device 12 or 16 produces a plurality of sets of encoded data slices, which are provided with their respective slice names to the storage units for storage. As shown, the first set of encoded data slices includes EDS 1_1 through EDS 5_1 and the first set of slice names includes SN 1_1 through SN 5_1 and the last set of encoded data slices includes EDS 1_Y through EDS 5_Y and the last set of slice names includes SN 1_Y through SN 5_Y.

Figure 7:
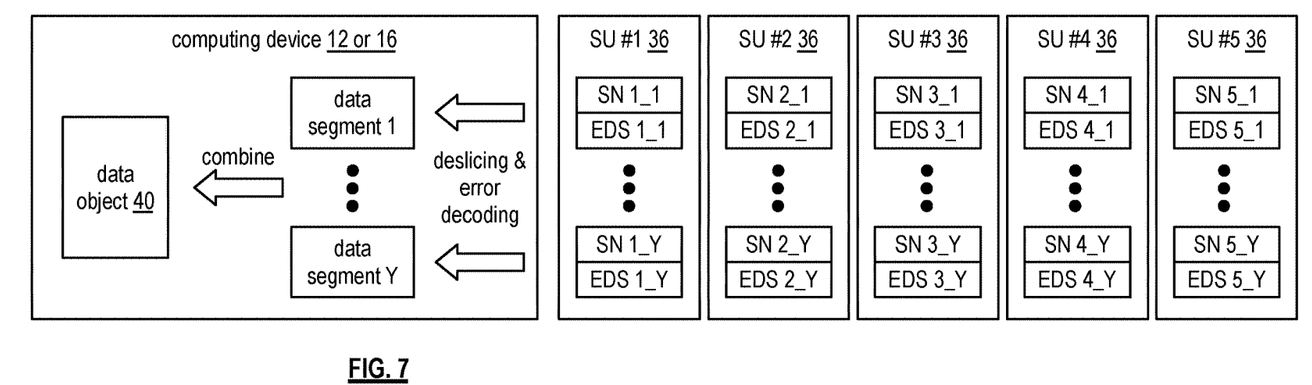
FIG. 7 is a schematic block diagram of an example of dispersed storage error decoding of data in accordance with the present invention.

FIG. 7 is a schematic block diagram of an example of dispersed storage error decoding of a data object that was dispersed storage error encoded and stored in the example of FIG. 4. In this example, the computing device 12 or 16 retrieves from the storage units at least the decode threshold number of encoded data slices per data segment. As a specific example, the computing device retrieves a read threshold number of encoded data slices.

Figure 8:
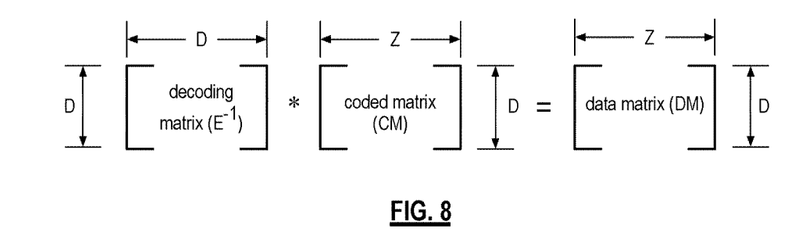
FIG. 8 is a schematic block diagram of a generic example of an error decoding function in accordance with the present invention.

To recover a data segment from a decode threshold number of encoded data slices, the computing device uses a decoding function as shown in FIG. 8. As shown, the decoding function is essentially an inverse of the encoding function of FIG. 4. The coded matrix includes a decode threshold number of rows (e.g., three in this example) and the decoding matrix in an inversion of the encoding matrix that includes the corresponding rows of the coded matrix. For example, if the coded matrix includes rows 1, 2, and 4, the encoding matrix is reduced to rows 1, 2, and 4, and then inverted to produce the decoding matrix.

Figure 9:
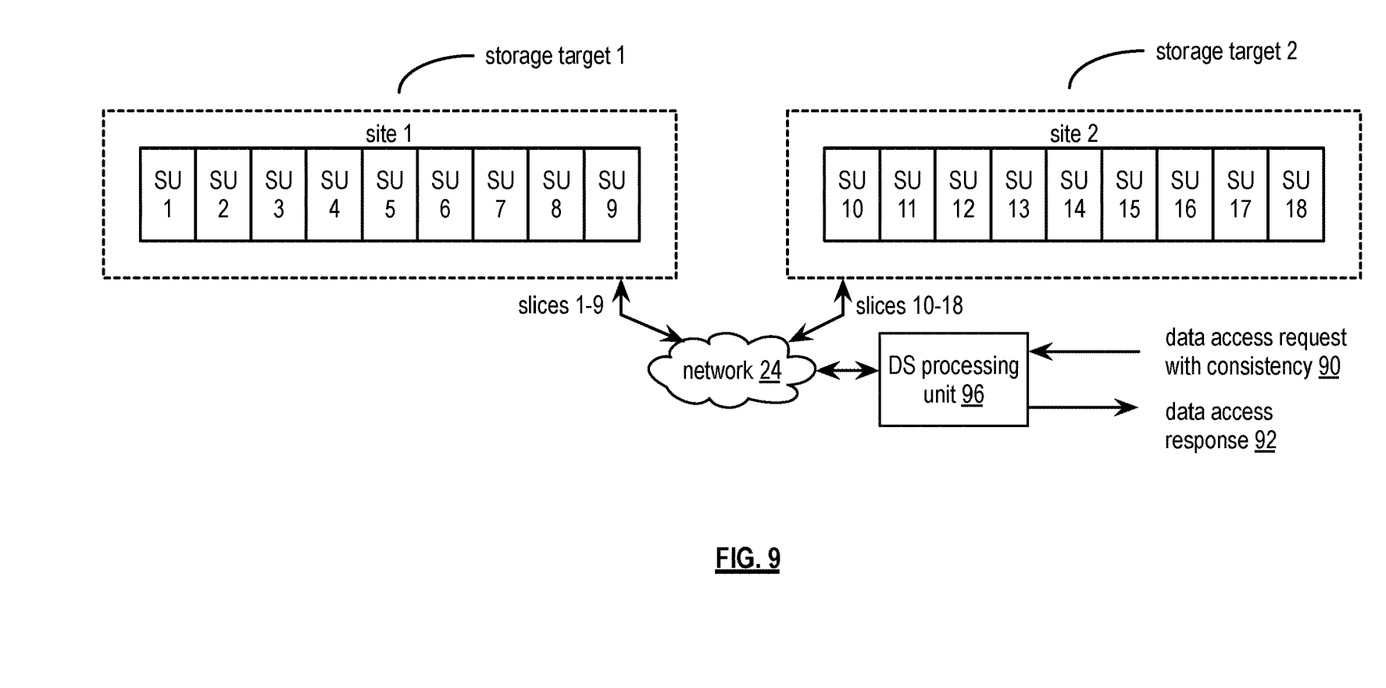
FIG. 9 is a schematic block diagram of another embodiment of a dispersed storage network (DSN) in accordance with the present invention.

FIG. 9 is a schematic block diagram of another embodiment of a dispersed storage network (DSN) that includes storage targets 1 and 2, network 24 of FIG. 1 and a DS processing unit 96. The DS processing unit 96 may be implemented by one or more of the computing devices 12-16, the DSN managing unit 18, and the integrity processing unit 20 of FIG. 1. The DSN may be implemented utilizing the DSN of FIG. 1. The DSN functions to access data stored in the set of storage units 1-18. In an example of operation of the accessing of the data, the DS processing unit 96 receives a data access request with consistency 90. The request includes a threshold number of storage targets indicator, where the set of storage units includes two or more storage targets (e.g., site 1, site 2) and where each storage target includes at least a decode threshold number of storage units. As such, the threshold number of storage targets indicator indicates a minimum number of sites to be utilized in the accessing of the data.

The request further includes at least one of a read data request or a write data request. The threshold number indicates one of a read storage targets threshold and a write storage target threshold, where the read storage target threshold plus the write storage target threshold is greater than a number of storage targets when providing strong data consistency. For example, the write storage target threshold is 2 when the read storage target threshold is 1 and the number of storage targets is 2. As another example, the read storage target threshold is 1 when the write storage target threshold is 2 and the number of storage targets is 2.

Having received the data access request with consistency 90, the DS processing unit 96 accesses a threshold number of storage targets to perform the data access request. For example, the DS processing unit 96 accesses storage units of one storage target when the threshold number is 1. As another example, the DS processing unit 96 accesses all storage units of storage targets 1 and 2 when the threshold number is 2. The accessing includes issuing, via the network 24, either read slice requests or write slice requests.

Having accessed the threshold number of storage targets, the DS processing unit 96 issues a data access response 92 to a requesting entity based on the accessing of the threshold number of storage targets. For example, the DS processing unit 96 issues a data access response 92 that includes a status indicator indicating a number of storage targets accessed when writing data. As another example, the DS processing unit 96 issues another data access response 92 that includes the latest revision of data and the status indicator indicating the number of storage targets accessed when reading the data.

Figure 10:
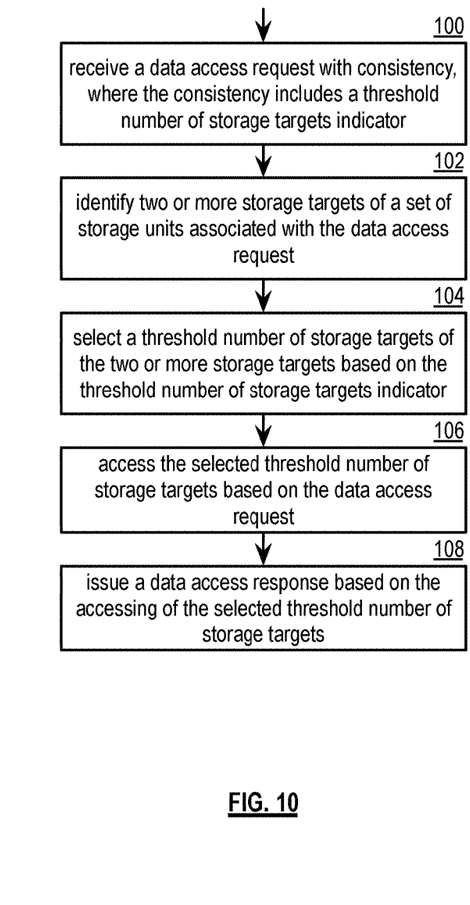
FIG. 10 is a flowchart illustrating an example of accessing a set of storage units in accordance with the present invention.

FIG. 10 is a flowchart illustrating an example of accessing a set of storage units. The method begins or continues at step 100 where a processing module (e.g., of a dispersed storage (DS) processing unit, of a computing device, etc.) receives a data access request with consistency, where the consistency includes a threshold number of storage targets indicator. A storage target may include of one of memory devices, a storage unit(s), a set of storage units, a plurality of sets of storage units and a site. The method continues at step 102 where the processing module identifies two or more storage targets of a set of storage units associated with the data access request. The identifying includes at least one of interpreting system registry information, receiving an input, initiating a query, and interpreting a query response.

The method continues at step 104 where the processing module selects a threshold number of storage targets of the two or more storage targets based on the threshold number of storage targets indicator. The selecting includes at least one of interpreting an operation log to identify a most recent revision, interpreting an error message, and interpreting the system registry information, and receiving an input.

The method continues at step 106 where the processing module accesses the selected threshold number of storage targets based on the data access request. For example, when writing data, the processing module issues write slice requests to storage units associated with the selected storage targets and receives write slice responses. As another example, when reading data, the processing module issues read slice requests to the storage units associated with the selected storage targets, receives read slice responses, identifies a most recent revision, and decode slices associated with the most recent revision to reproduce the data. The accessing may further include identifying a number of storage targets to utilize.

The method continues at step 108 where the processing module issues a data access response based on the accessing of the selected threshold number of storage targets. For example, when writing the data, the processing module indicates the number of storage targets accessed. As another example, when reading the data, the processing module indicates the number of storage targets accessed and generates the data access response to include the reproduce data.

Figure 11:
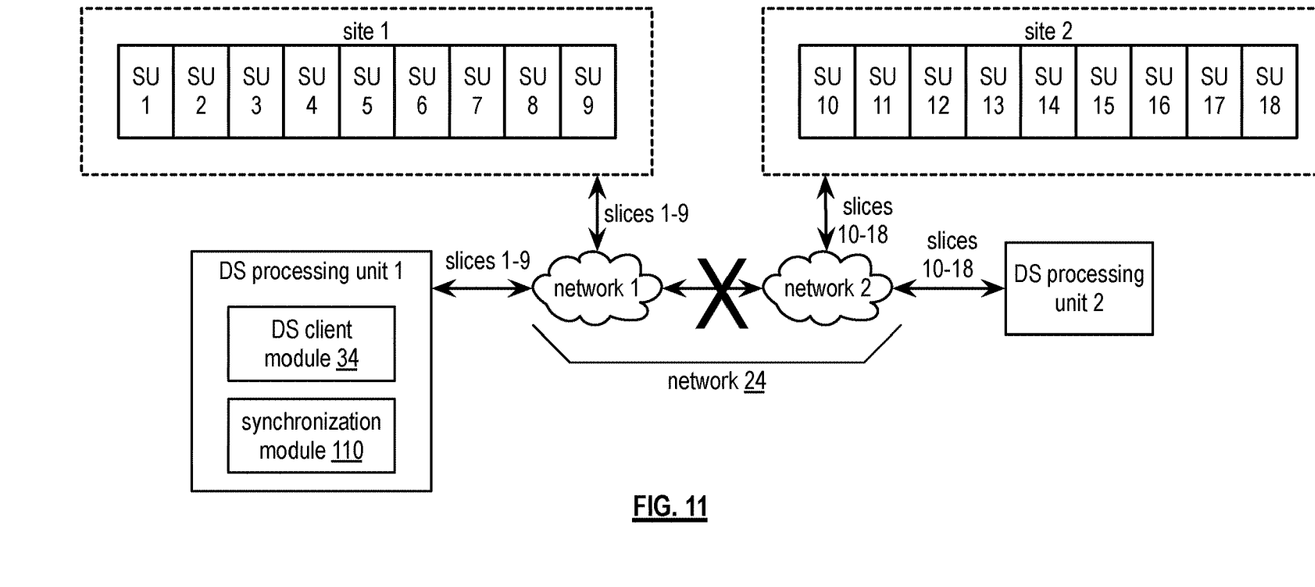
FIG. 11 is a schematic block diagram of an embodiment of a dispersed storage network (DSN) in accordance with the present invention.

FIG. 11 is a schematic block diagram of an embodiment of a dispersed storage network (DSN). The DSN may be implemented utilizing the DSN of FIG. 9. The DS processing units 1-2 further includes the dispersed storage (DS) client module 34 of FIG. 1 and a synchronization module 110. The synchronization module 110 may be implemented utilizing the processing module 50 of FIG. 2. The DSN functions to access data stored in the set of storage units and to synchronize stored data when transitioning from the impaired mode to the strong consistency mode. The impaired mode is realized when less than all of the storage units are available and one or more of the write threshold number and the read threshold number are adjusted for operations with less than a full complement of the IDA width number of storage units. The strong consistency mode is supported when all of the storage units are available and the read threshold plus the write threshold is greater than the IDA width number.

In an example of operation, the DS client module 34 of DS processing unit 1 initiates writing data to two or more sites (e.g., to two or more partitions). For example, the DS client module 34 dispersed storage error encodes a data segment to produce a set of encoded data slices 1-18, sends, via the network 1, encoded data slices 1-9 to the site 1 (e.g., a first partition) and attempts to send, via the network 2, encoded data slices 10-18 to the site 2 (e.g., a second partition).

Having sent the encoded data slices 10-18 to the site 2, the DS client module 34 detects a write failure to site 2 (e.g., does not receive favorable write slice responses within a time frame). Having detected the write failure, the DS client module 34 generates an operation log entry to indicate the write failure (e.g., storing slice names, a storage unit identifier, and a site identifier).

The synchronization module 110 initiates synchronization of stored revisions of data across the two or more sites when the two or more sites are again available. For example, the synchronization module 110 retrieves encoded data slices 1-9 corresponding to missing revisions of encoded data slices associated with site 2, generates rebuilt encoded data slices 10-18 from the retrieved encoded data slices, and stores the rebuilt encoded data slices in the storage units of site 2 (e.g., storage units 10-18).

To enable stabilization of the synchronization of the store data and further writing, the synchronization module 110 inhibits further writing of data by the DST client module 34 while a threshold number of synchronization operations remain open. When the threshold number of synchronization operations have completed, the synchronization module 110 enables the further writing of the data.

Figure 12:
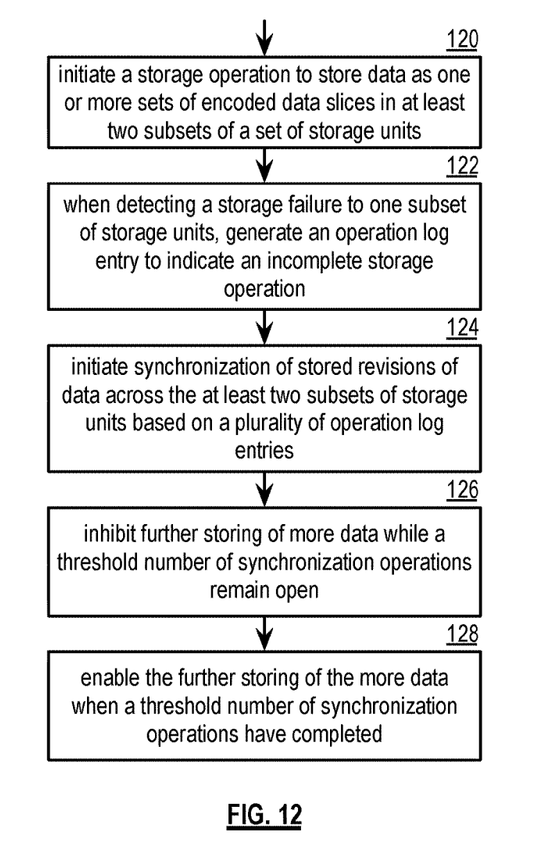
FIG. 12 is a flowchart illustrating an example of synchronizing stored data in accordance with the present invention.

FIG. 12 is a flowchart illustrating an example of synchronizing stored data. The method begins or continues with steps 120 where a processing module (e.g., of a DS processing unit) initiates a storage operation to store data as one or more sets of encoded data slices in at least two subsets of a set of storage units. The method continues with step 122, where the processing module, when detecting a storage failure to one subset of storage units, generates an operation log entry to indicate an incomplete storage operation.

The method continues at step 124 where the processing module initiates synchronization of stored revisions of data across the at least two subsets of storage units based on a plurality of operation log entries. The initiating includes detecting that the two or more subsets of storage units are available. The initiating further includes obtaining the plurality of operation log entries, identifying missing encoded data slices, rebuilding rebuilt encoded data slices corresponding to the missing encoded data slices, and storing the rebuilt encoded data slices.

The method continues at step 126 where the processing module inhibits further storing of more data while a threshold number of synchronization operations remain open. When a threshold number of synchronization operations have been completed, the method continues at step 128 where the processing module enables the further storing of the more data. For example, the processing module detects that the threshold number of synchronization operations have been completed and indicates that the storing of the data is enabled. The method may loop back to step 120, where the processing module initiates the storage operation to store data.

Figure 13:
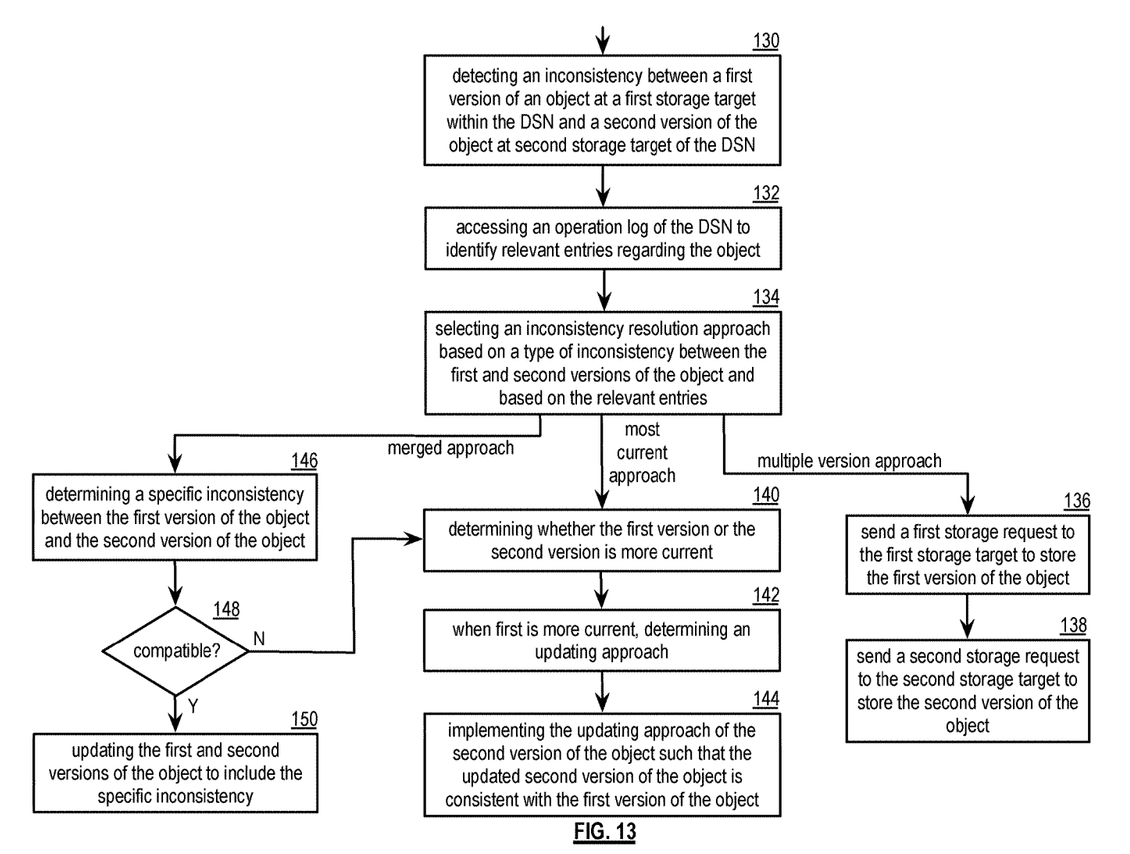
FIG. 13 is a flowchart illustrating an example of recovering from conflicts that may emerge from eventually consistent operations in accordance with the present invention.

FIG. 13 is a flowchart illustrating an example of recovering from conflicts that may emerge from eventually consistent operations. For example, the conflict may result from operations where an object (e.g., an encoded data slice, a set of encoded data slices, a plurality of sets of encoded data slices, replicated copies of slices, etc.) is updated to two different versions at two storage targets (e.g., two sets of storage units). As another example, the conflict may result from operations where an object is deleted at one storage target and updated at another storage target. As a further example, the conflict may result from operations where different meta-data fields are modified (e.g., updated, added differently) between different storage targets.

The method begins at step 130, where a computing device (e.g., the synchronization module 110 of FIG. 11, a computing device 12-16 of FIG. 1, etc.) of a dispersed storage network (DSN) detects an inconsistency between a first version of an object at a first storage target of the DSN and a second version of the object at second storage target of the DSN. The method continues at step 132, where the computing device accesses an operation log of the DSN to identify relevant entries regarding the object. For example, the operation log records requested data access operations for execution within the DSN.

The method continues at step 134, where the computing device selects an inconsistency resolution approach from a list of inconsistency resolution approaches based on a type of inconsistency between the first and second versions of the object and based on the relevant entries of the operation log. The list of inconsistency resolution approaches includes a multiple version storage option, a most current version storage option, and a merged version storage option.

When the selected inconsistency resolution approach is the multiple version storage option, the method continues at step 136, where the computing device sends a first storage request to the first storage target to store the first version of the object. The method continues at step 138, where the computing device sends a second storage request to the second storage target to store the second version of the object. The computing device may also store respective version metadata of the first and second versions, and any respective delete markers of the first and second versions in both the first and second storage targets.

When the selected inconsistency resolution approach is the most current version storage option, the method continues at step 140, where the computing device determines whether the first version of the object or the second version of the object is more current based on the relevant entries of the operation log. When the first version of the object is more current, the method continues to step 142, where the computing device determines an updating approach of the second version of the object based on a type of the object. Alternatively, when the second version is more current the computing device performs steps 142-144 for the first version.

In an example of operation, when the type of the object is an encoded data slice of a set of encoded data slices, the first version of the object is a first copy of the encoded data slice having a first revision level, and the second version of the object is a second copy of the encoded data slice having a second revision level, the computing device determines whether the first revision level is a more current revision level of the encoded data slice than the second revision level. In one example, the computing device may compare a timestamp of the first version to a timestamp of the second version and use the more recent respective timestamp as the more current revision level. In another example, the computing device may compare a revision number of the encoded data slice having the first version to a revision number of the encoded data slice having the second version and use the version with the higher respective revision number as the more current revision level.

For example, when the first revision level is the more current revision level of the encoded data slice, the computing device determines the updating approach to include overwriting of the second version of the object with the first version of the object by the second storage target. In this example, the first storage target is a first storage unit in a first set of storage units and the second storage target is a first storage unit in a second set of storage units.

In another example of operation, when the type of the object is two or more encoded data slices of a set of encoded data slices, the computing devices determines whether the first revision level is a more current revision level for the set of encoded data slices than the second revision level. For example, the first version of the object is a first encoded data slice of the two or more encoded data slices and the second version of the object is a second encoded data slice of the two or more encoded data slices. The first encoded data slice has a first revision level and the second encoded data slice has a second revision level. When the first revision level is the more current revision level of the set of encoded data slices, the computing device determines the updating approach includes rebuilding the second encoded data slice to have the first revision level. For example, the computing device obtains a decode threshold number first revision level encoded data slices of the set of encoded data slices to produce a rebuilt second encoded data slice.

In yet another example of operation, when the type of the object is an encoded data slice of a set of encoded data slices, the first version of the object is a first copy of the encoded data slice having a first metadata, and the second version of the object is a second copy of the encoded data slice having a second metadata, the computing device determines whether the first metadata is more current metadata for the encoded data slice than the second metadata. When the first metadata is the more current metadata for the encoded data slice than the second metadata, the computing device determines the updating approach includes overwriting the second metadata with the first metadata by the second storage target.

In yet still another example of operation, when the type of the object is two or more encoded data slices of a set of encoded data slices, wherein the first version of the object is a first encoded data slice having first metadata of the two or more encoded data slices and the second version of the object is a second encoded data slice having second metadata of the two or more encoded data slices, the computing device determines whether the first metadata is more current metadata for the encoded data slice than the second metadata. When the first metadata is the more current metadata for the encoded data slice than the second metadata, the computing device determines the updating approach to include updating the second metadata to be consistent with the first metadata. The method continues at step 144, where the computing device implements the updating approach of the second version of the object such that the updated second version of the object is consistent with the first version of the object.

When the selected inconsistency resolution approach is the merged version storage option, the method continues at step 146, where the computing device determines a specific inconsistency between the first version of the object and the second version of the object. The method continues at step 148, where the computing device determines whether the specific inconsistency is compatible or incompatible. For example, the computing device determines whether changes to the metadata can be merged (e.g., can the combination of distinct updated fields be combined to form a new metadata object). When the specific inconsistency is compatible, the method continues at step 150, where the computing device updates the first and second versions of the object to include the specific inconsistency. When the specific inconsistency is incompatible, the method continues back to step 140, where the computing device utilizes the most current version storage option (e.g., steps 140-144) to resolve the specific inconsistency.

It is noted that terminologies as may be used herein such as bit stream, stream, signal sequence, etc. (or their equivalents) have been used interchangeably to describe digital information whose content corresponds to any of a number of desired types (e.g., data, video, speech, audio, etc. any of which may generally be referred to as 'data').

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "configured to", "operably coupled to", "coupled to", and/or "coupling" includes direct coupling between items and/or indirect coupling between items via an intervening item (e.g., an item includes, but is not limited to, a component, an element, a circuit, and/or a module) where, for an example of indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "configured to", "operable to", "coupled to", or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item.

As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1. As may be used herein, the term "compares unfavorably", indicates that a comparison between two or more items, signals, etc., fails to provide the desired relationship.

As may also be used herein, the terms "processing module", "processing circuit", "processor", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

One or more embodiments have been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality.

To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

In addition, a flow diagram may include a "start" and/or "continue" indication. The "start" and "continue" indications reflect that the steps presented can optionally be incorporated in or otherwise used in conjunction with other routines. In this context, "start" indicates the beginning of the first step presented and may be preceded by other activities not specifically shown. Further, the "continue" indication reflects that the steps presented may be performed multiple times and/or may be succeeded by other activities not specifically shown. Further, while a flow diagram indicates a particular ordering of steps, other orderings are likewise possible provided that the principles of causality are maintained.

The one or more embodiments are used herein to illustrate one or more aspects, one or more features, one or more concepts, and/or one or more examples. A physical embodiment of an apparatus, an article of manufacture, a machine, and/or of a process may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of one or more of the embodiments. A module implements one or more functions via a device such as a processor or other processing device or other hardware that may include or operate in association with a memory that stores operational instructions. A module may operate independently and/or in conjunction with software and/or firmware. As also used herein, a module may contain one or more sub-modules, each of which may be one or more modules.

As may further be used herein, a computer readable memory includes one or more memory elements. A memory element may be a separate memory device, multiple memory devices, or a set of memory locations within a memory device. Such a memory device may be a read-only memory, random access memory, volatile memory, non-volatile memory, static memory, dynamic memory, flash memory, cache memory, and/or any device that stores digital information. The memory device may be in a form a solid state memory, a hard drive memory, cloud memory, thumb drive, server memory, computing device memory, and/or other physical medium for storing digital information.

While particular combinations of various functions and features of the one or more embodiments have been expressly described herein, other combinations of these features and functions are likewise possible. The present disclosure is not limited by the particular examples disclosed herein and expressly incorporates these other combinations.

What is claimed is:

1. A method comprises:
    detecting, by a computing device of a dispersed storage network (DSN), an inconsistency between a first version of an object at a first storage target within the DSN and a second version of the object at second storage target of the DSN;
    accessing, by the computing device, an operation log of the DSN to identify relevant entries regarding the object, wherein the operation log records requested data access operations for execution within the DSN;
    selecting, by the computing device, an inconsistency resolution approach from a list of inconsistency resolution approaches based on a type of inconsistency between the first and second versions of the object and based on the relevant entries, wherein the list of inconsistency resolution approaches includes a multiple version storage option, a most current version storage option, and a merged version storage option;
    when the selected inconsistency resolution approach is the multiple version storage option:
        sending, by the computing device, a first storage request to the first storage target to store the first version of the object; and
        sending, by the computing device, a second storage request to the second storage target to store the second version of the object;
    when the selected inconsistency resolution approach is the merged version storage option:
        determining, by the computing device, a specific inconsistency between the first version of the object and the second version of the object;
        determining, by the computing device, whether the specific inconsistency is compatible or incompatible;
        when the specific inconsistency is compatible:
            updating the first and second versions of the object to include the specific inconsistency; and
        when the specific inconsistency is incompatible:
            utilizing the most current version storage option to resolve the specific inconsistency; and when the selected inconsistency resolution approach is the most current version storage option:
  determining, by the computing device, whether the first version of the object or the second version of the object is more current based on the relevant entries of the operation log;
  when the first version of the object is more current, determining, by the computing device, determining an updating approach of the second version of the object based on a type of the object, wherein determining the updating approach includes, when the type of the object is an encoded data slice of a set of encoded data slices, the first version of the object is a first copy of the encoded data slice having a first revision level, and the second version of the object is a second copy of the encoded data slice having a second revision level, determining whether the first revision level is a more current revision level of the encoded data slice than the second revision level; and
  implementing, by the computing device, the updating approach of the second version of the object such that the updated second version of the object is consistent with the first version of the object.

2. The method of claim 1, wherein determining the updating further approach comprises:
  when the first revision level is the more current revision level of the encoded data slice, determining the updating approach to include overwriting of the second version of the object with the first version of the object by the second storage target, wherein the first storage target is a first storage unit in a first set of storage units and the second storage target is a first storage unit in a second set of storage units.

3. The method of claim 1, wherein determining the updating approach comprises:
  when the type of the object is two or more encoded data slices of a set of encoded data slices, wherein the first version of the object is a first encoded data slice of the two or more encoded data slices and the second version of the object is a second encoded data slice of the two or more encoded data slices, wherein the first encoded data slice has a first revision level and the second encoded data slice has a second revision level, determining whether the first revision level is a more current revision level for the set of encoded data slices than the second revision level; and
  when the first revision level is the more current revision level of the set of encoded data slices, determining the updating approach to include rebuilding the second encoded data slice to have the first revision level, wherein the first storage target is a first storage unit in a set of storage units and the second storage target is a second storage unit in the set of storage units.

4. The method of claim 1, wherein determining the updating approach comprises:
  when the type of the object is an encoded data slice of a set of encoded data slices, the first version of the object is a first copy of the encoded data slice having a first metadata, and the second version of the object is a second copy of the encoded data slice having a second metadata, determining whether the first metadata is more current metadata for the encoded data slice than the second metadata; and
  when the first metadata is the more current metadata for the encoded data slice than the second metadata, determining the updating approach to include overwriting of the second metadata with the first metadata by the second storage target.

5. The method of claim 1, wherein determining the updating approach comprises:
  when the type of the object is two or more encoded data slices of a set of encoded data slices, wherein the first version of the object is a first encoded data slice of the two or more encoded data slices and the second version of the object is a second encoded data slice of the two or more encoded data slices, wherein the first encoded data slice has first metadata and the second encoded data slice has second metadata, determining whether the first metadata is more current metadata for the set of encoded data slices than the second metadata; and
  when the first metadata is the more current metadata for the set of encoded data slices than the second metadata, determining the updating approach to include updating the second metadata to be consistent with the first metadata.

6. A computing device of a dispersed storage network (DSN), wherein the computing device comprises:
  memory;
  an interface; and
  a processing module operably coupled to the memory and the interface, wherein the processing module is operable to:
    detect an inconsistency between a first version of an object at a first storage target within the DSN and a second version of the object at second storage target of the DSN;
    access an operation log of the DSN to identify relevant entries regarding the object, wherein the operation log records requested data access operations for execution within the DSN;
    select an inconsistency resolution approach from a list of inconsistency resolution approaches based on a type of inconsistency between the first and second versions of the object and based on the relevant entries, wherein the list of inconsistency resolution approaches includes a multiple version storage option, a most current version storage option, and a merged version storage option;
  when the selected inconsistency resolution approach is the multiple version storage option:
    send, via the interface, a first storage request to the first storage target to store the first version of the object; and
    send, via the interface, a second storage request to the second storage target to store the second version of the object;
  when the selected inconsistency resolution approach is the merged version storage option:
    determining, by the computing device, a specific inconsistency between the first version of the object and the second version of the object;
    determining, by the computing device, whether the specific inconsistency is compatible or incompatible;
    when the specific inconsistency is compatible:
      updating the first and second versions of the object to include the specific inconsistency; and
    when the specific inconsistency is incompatible:
      utilizing the most current version storage option to resolve the specific inconsistency; and
  when the selected inconsistency resolution approach is the most current version storage option:
    determining, by the computing device, whether the first version of the object or the second version of the object is more current based on the relevant entries of the operation log;
    when the first version of the object is more current, determining, by the computing device, determining an updating approach of the second version of the object based on a type of the object, wherein determining the updating approach includes, when the type of the object is an encoded data slice of a set of encoded data slices, the first version of the object is a first copy of the encoded data slice having a first revision level, and the second version of the object is a second copy of the encoded data slice having a second revision level, determining whether the first revision level is a more current revision level of the encoded data slice than the second revision level; and implementing, by the computing device, the updating approach of the second version of the object such that the updated second version of the object is consistent with the first version of the object.

7. The computing device of claim 6, wherein the processing module is further operable to determine the updating approach by:

when the first revision level is the more current revision level of the encoded data slice, determining the updating approach to include overwriting of the second version of the object with the first version of the object by the second storage target, wherein the first storage target is a first storage unit in a first set of storage units and the second storage target is a first storage unit in a second set of storage units.

8. The computing device of claim 6, wherein the processing module is further operable to determine the updating approach by:

when the type of the object is two or more encoded data slices of a set of encoded data slices, wherein the first version of the object is a first encoded data slice of the two or more encoded data slices and the second version of the object is a second encoded data slice of the two or more encoded data slices, wherein the first encoded data slice has a first revision level and the second encoded data slice has a second revision level, determining whether the first revision level is a more current revision level for the set of encoded data slices than the second revision level; and when the first revision level is the more current revision level of the set of encoded data slices, determining the updating approach to include rebuilding the second encoded data slice to have the first revision level, wherein the first storage target is a first storage unit in a set of storage units and the second storage target is a second storage unit in the set of storage units.

9. The computing device of claim 6, wherein the processing module is further operable to determine the updating approach by:

when the type of the object is an encoded data slice of a set of encoded data slices, the first version of the object is a first copy of the encoded data slice having a first metadata, and the second version of the object is a second copy of the encoded data slice having a second metadata, determining whether the first metadata is more current metadata for the encoded data slice than the second metadata; and when the first metadata is the more current metadata for the encoded data slice than the second metadata, determining the updating approach to include overwriting of the second metadata with the first metadata by the second storage target.

10. The computing device of claim 6, wherein the processing module is further operable to determine the updating approach by:

when the type of the object is two or more encoded data slices of a set of encoded data slices, wherein the first version of the object is a first encoded data slice of the two or more encoded data slices and the second version of the object is a second encoded data slice of the two or more encoded data slices, wherein the first encoded data slice has first metadata and the second encoded data slice has second metadata, determining whether the first metadata is more current metadata for the set of encoded data slices than the second metadata; and when the first metadata is the more current metadata for the set of encoded data slices than the second metadata, determining the updating approach to include updating the second metadata to be consistent with the first metadata.

* * * * *